Figure 1:
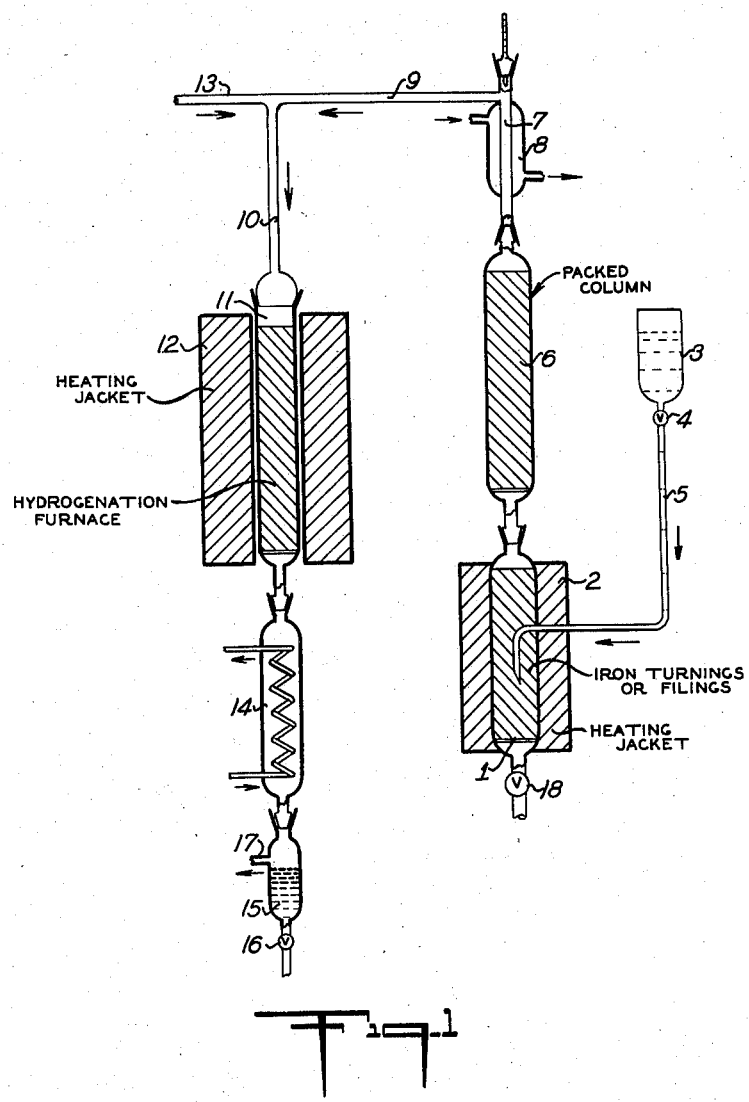

May 19, 1959 H. NOESKE ET AL 2,887,517
PRODUCTION OF CYCLOPENTENE
Filed June 29, 1954 2 Sheets-Sheet 1

INVENTOR
HEINZ NOESKE
HELMUT KOLLING

BY Burgess & Dinklage

ATTORNEY

May 19, 1959 — H. NOESKE ET AL — 2,887,517
PRODUCTION OF CYCLOPENTENE
Filed June 29, 1954 — 2 Sheets-Sheet 2
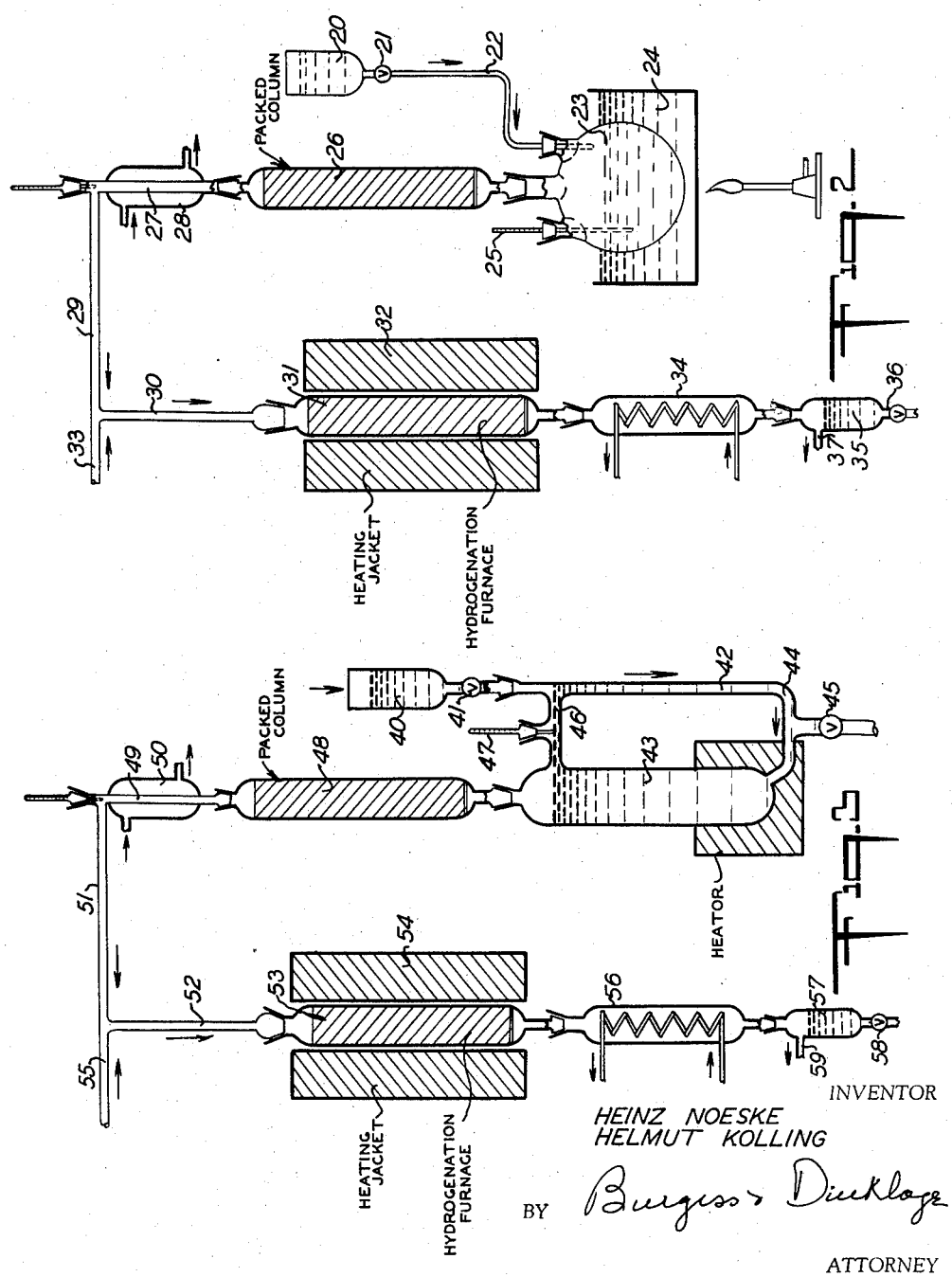
INVENTOR
HEINZ NOESKE
HELMUT KOLLING United States Patent Office 2,887,517
Patented May 19, 1959

2,887,517

PRODUCTION OF CYCLOPENTENE

Heinz Noeske, Oberhausen-Sterkrade, and Helmut Kolling, Duisburg-Hamborn, Germany, assignors to Ruhrchemie Aktiengesellschaft, Oberhausen-Holten, Germany, a corporation of Germany Application June 29, 1954, Serial No. 440,212

Claims priority, application Germany June 29, 1953

12 Claims. (Cl. 260—666)

This invention relates to improvements in the production of cyclopentene.

In the past, cyclopentene has conventionally been most commonly produced from cyclopentane. The cyclopentane was converted into cyclopentene by catalytic treatment or by the addition of halogen and splitting-off of hydrogen halide. These processes, however, have the disadvantage that the cyclopentane required as the starting material is difficult to obtain in pure form.

It has also been suggested to produce cyclopentene from dicyclopentadiene which is easier to produce than cyclopentane. In this process, the dicyclopentadiene is converted by a heat treatment into monocyclopentadiene which is then converted into cyclopentene by subjecting it to a selective pressure hydrogenation. Due to the fact that monocyclopentadiene dimerizes very easily, even at temperatures as low as room temperature, the yields of cyclopentene obtained in the pressure hydrogenation are relatively low. Substantial portions of the monocyclopentadiene are reconverted into dicyclopentadiene. Attempts have been made to overcome this difficulty by effecting the hydrogenation of the monocyclopentadiene at relatively low temperatures, as for example, below 100° C. and with relatively small quantities of hydrogen as, for example, 65–80% of the theoretically required quantity. Even with these steps however, the yields obtainable are not substantially better than those obtained by the dehydrogenation of cyclopentane. Due to the small quantity of hydrogen used and the low hydrogenation temperatures the reaction periods must be prolonged to such an extent that an increase in the undesirable dimerization is unavoidable. Due to the insufficient amount of hydrogen used a high conversion cannot even be theoretically expected in this mode of operation.

One object of this invention is the production of cyclopentene from dicyclopentadiene and cyclopentadiene without the above mentioned disadvantages. This and still further objects will become apparent from the following description:

In accordance with the invention monocyclopentadiene is passed in the vapor phase at normal pressure in contact with approximately the theoretically required quantity of hydrogen over a fixed bed of hydrogenation catalyst. This results in a high yield of cyclopentene without the disadvantages mentioned above.

The cyclopentadiene is preferably formed by converting dicyclopentadiene into vaporous monocyclopentadiene by evaporation and/or a catalytic treatment.

The catalyst used in the hydrogenation in the form of a fixed bed may be any conventional hydrogenation catalyst, as for example, nickel or cobalt catalysts having a sufficient strength. Instead of using fixed-bed catalysts, the hydrogenation may be effected in any other known manner, as, for example, with the use of suspended catalysts.

Due to the gaseous state during the hydrogenation which is effected under normal pressure the danger of dimerization of the monocyclopentadiene is so small that even at high reaction temperatures of, for example, 100 to 150° C., practically no formation of dicyclopentadiene will occur. Owing to the high hydrogenation temperatures which may be used, relatively short reaction periods are sufficient for complete conversion of the monocyclopentadiene into cyclopentene.

The process in accordance with the invention has the further advantage that the equipment required for effecting the same may be relatively simple since small reaction spaces which need not be pressure resistant will suffice.

Conventional catalysts which are used for the addition of hydrogen may be used as hydrogenation catalysts in accordance with the invention. Nickel or cobalt containing catalysts are preferably used.

The production of the monocyclopentadiene from dicyclopentadiene may be effected in the conventional manner by a heat treatment in the presence of catalysts as, for example, with the use of iron turnings. The heat treatment of the cyclopentadiene may also be effected in the absence of catalysts. The resulting monocyclopentadiene mixed with the hydrogen required is evaporated and passed over the fixed bed of hydrogenation catalyst. It is of particular advantage to effect the heat treatment of the dicyclopentadiene in a distillation device provided with a dephlegmator. The operating temperature of the dephlegmator is adjusted in such a manner that dicyclopentadiene is refluxed and only monocyclopentadiene escapes in the vaporous state.

Due to the long residence time of the dicyclopentadiene in the distillation vessel, however, certain portions thereof polymerize to form higher boiling products that are lost to the production of the monocyclopentadiene.

It has further been found possible to overcome this disadvantage by allowing the dicyclopentadiene which has been preheated to a temperature of 150 to 200° C. to trickle downwardly over a layer of iron turnings or iron filing bodies which are maintained at the same temperature. A device which is suitable for this purpose is diagrammatically shown in Fig. 1 in which 1 is a column packed with iron turnings or iron filing bodies. The column is surrounded by a heating jacket 2 by means of which the column 1 may be maintained at a constant temperature. The cyclopentadiene to be treated is filled into the funnel 3 and then slowly introduced to the column by means of a valve 4 and a line 5.

The vapors forming in the column 1 flow through the packed column 6. This column is provided at the top with a dephlegmator 7 which is maintained at a constant temperature by means of a cooler 8. The vaporized cyclopentadiene passes through lines 9 and 10 into the hydrogenation furnace 11 which is surrounded by a heating jacket 12 by means of which the hydrogenation furnace 11 is maintained at a constant temperature. Within the hydrogenation furnace 11, the catalysts used for the hydrogenation are arranged. The hydrogen required is supplied by means of line 13. In the cooler 14 located downstream of the hydrogenation furnace the cyclopentene formed during the hydrogenation is condensed. It contains only little cyclopentane and collects in the container 15 from which it may be withdrawn by means of a valve 16 mounted at the bottom. The gaseous constituents escape through line 17.

At the bottom of the column 1, a valve 18 is installed which may be used for the removal of high molecular weight residues.

By means of this equipment, more than 95% of the cyclopentadiene charged may be converted into cyclopentene. After an extended period of time, however, the iron turnings or iron filing bodies contained in the column 1 become covered with a layer of resinous residues.

The disadvantage of these occasional obstructions may be avoided by passing the dicyclopentadiene which has previously been preheated through a sufficient height of a hydrocarbon heated to 150–250° C. A hydrocarbon should be used for this purpose, which does not evaporate at the temperatures employed. Above the heated hydrocarbon layer the gaseous monocyclopentadiene is separated from the entrained dicyclopentadiene in a fractionation column provided with a dephlegmator. A device which is suitable for this purpose is diagrammatically shown in Fig. 2.

The cyclopentadiene to be processed is filled into a funnel 20. By means of a valve 21 and the line 22 it slowly flows into a container 23 which is filled with a high boiling saturated hydrocarbon heated to approximately 240° C. The container 23 is most expediently heated by an oil bath 24. The temperature is controlled by a thermometer 25.

The escaping cyclopentadiene vapors flow through the packed column 26. Raschig rings are preferably used as the packing. A dephlegmator 27 which, by means of a cooler 28, is maintained at a constant temperature is attached to the top of this column. The escaping monocyclopentadiene vapors pass through the lines 29 and 30 and into a vertical tube 31 filled with the hydrogenation catalyst. This tube is surrounded by a heating jacket 32 by means of which the catalyst may be maintained at a constant temperature.

The hydrogen used for the hydrogenation is admitted through the line 33. The cyclopentene formed by the hydrogenation is condensed in a cooler 34 and collected in a vessel 35 from which it may be withdrawn by means of a valve 36 provided at the bottom. The excess hydrogen escapes through line 37.

The heating of the hydrocarbon layer or hydrocarbon column used for the formation of monocyclopentadiene may be effected in any manner. It is of particular advantage to effect this heating by means of a thermosyphon system with the heated hydrocarbon continuously circulating within the thermo-syphon device. A device which is suitable for this purpose is shown in Fig. 3.

The cyclopentadiene to be processed is contained in the funnel 40. By means of a cock 41, it is allowed to flow into the thermo-syphon device which is preferably filled with a saturated aliphatic hydrocarbon, the boiling point of which ranges about 50° C. higher than that of the dicyclopentadiene.

The thermo-syphon system consists of a vertical tube 42 and a vertical cylindrical container 43 having a relatively large cross section. The vertical containers 42 and 43 are interconnected at the top and at the bottom by horizontal lines. The lower connecting line 44 is provided at the bottom with a valve 45 from which residues may be discharged. A thermometer 47 is mounted in the upper connecting line 46.

The cyclopentadiene vapors developed within the thermo-syphon system pass through the packed column 48. At the top of this column a dephlegmator 49 is installed which is maintained at a constant temperature by means of the cooler 50.

The monocyclopentadiene escaping in the vaporous form passes through the lines 51 and 52 into the hydrogenation furnace 53 filled with a hydrogenation catalyst and surrounded by a heating jacket 54. The hydrogen required for the hydrogenation is admitted through line 55.

The cyclopentene formed by hydrogenation is condensed in the cooler 56 and flows into a receiver 57 from which it may be withdrawn through a valve 58. The excess hydrogenation gases escape through line 59.

A particular advantage of this method of operation consists that the same may be effected without the use of a catalyst. The yield of monocyclopentadiene amount to more than 95% and a practically 100% yield may be obtained in most cases. Formation of resinous polymerization products will not occur.

If, in the process of the invention, the monocyclopentadiene required as the starting material for the hydrogenation is obtained by cleavage in a heated hydrocarbon column, the yields of cyclopentene obtained will reach about 90% based on the dicyclopentadiene charged.

The following examples are given to further illustrate the invention and not to limit the same:

*Example 1*

150 cc. of a nickel-containing hydrogenation catalyst which had been prepared by precipitation and contained 100 parts by weight of nickel, 50 parts by weight of kieselguhr and 10 parts by weight of magnesia were filled into a vertical glass tube of 23 mm. inside diameter provided with a heating device. The glass tube and its contents were heated to 120° C.

Freshly prepared liquid cyclopentadiene was dropped into an evaporator at a rate of 40 cc. per hour and evaporated. The vapor, together with 10.5 normal liters of hydrogen were passed through the heated hydrogenation tube. The product issuing from the catalyst was cooled in a cooler, collected in a receiver and subjected to a heat treatment in order to dimerize the unconverted cyclopentadiene. By distillation, a 90% yield, based on the cyclopentadiene used, of 96% cyclopentene was obtained.

As a comparison with this, a hydrogenation in a pressure vessel was carried out. For this purpose, 1.6 kg. of freshly prepared cyclopentadiene was hydrogenated in the presence of 50 gms. of a nickel-containing hydrogenation catalyst in a pressure vessel at 80° C. and a pressure of 100 kg. per square centimeter until 80% of the quantity of hydrogen required for the hydrogenation of a double bond had been absorbed. The hydrogen absorption provided was terminated within 80 minutes.

After the dimerization of the unconverted cyclopentadiene, a 35% yield of a 94% cyclopentene was obtained by distillation.

It was thus found that the hydrogenation in accordance with the invention at normal pressure with the use of a sufficient quantity of hydrogen gives a yield of cyclopentene which is three times as high as that obtained by the pressure hydrogenation.

*Example 2*

Evaporated cyclopentadiene from a distilling device provided with a dephlegmator attached thereto and maintained at 50° C. was distilled over at a rate of 16 normal liters per hour into a hydrogenation furnace filled with 160 cc. of a nickel catalyst which had been prepared by precipitation and consisted of 95 parts by weight of chromium oxide ($Cr_2O_3$) and 5 parts by weight of nickel. The vessel of the distilling device contained dicyclopentadiene to which iron turnings had been added.

The hydrogenation device consisted of a heated tube of 23 mm. inside diameter maintained at 160° C. Together with the vaporous cyclopentadiene, 15.5 normal liters of hydrogen were hourly passed over the catalyst. The resulting reaction product was condensed by means of a cooler and collected in a receiver. After the dimerization of the unconverted cyclopentadiene by a heat treatment, 65% of the dicyclopentadiene charged as the starting product could be obtained as a 95% cyclopentene by distillation.

When the term iron filing bodies is used in the claims same is intended to designate iron filing bodies of any type including iron turnings and iron packings.

*Example 3*

Dicyclopentadiene which had been preheated to 150° C. was introduced at a rate of 30 cc. per hour to the middle of a vertical tube of 60 cm. in length and 23 mm. in inside diameter which was filled with iron turnings and provided at its lower end with a receiver. The reaction tube was maintained at 175° C. by means of a heating device. The reaction tube was connected with a column packed with filing bodies and a dephlegmator attached thereto and maintained at 48° C. The conversion was effected in the device shown in Fig. 2. The vapors escaping from the distilling column, mixed with 7.7 normal liters of hydrogen, were passed through a vertical hydrogenation furnace containing 100 cc. of a nickle-containing hydrogenation catalyst and heated at 120° C. The reaction product issuing from the furnace passed through a cooler and was then collected in a receiver. After the dimerization of the unconverted cyclopentadiene by a heat treatment, 85% of the dicyclopentadiene charged could be obtained as 96% cyclopentene by distillation.

*Example 4*

The cleavage of the dicyclopentadiene was effected in the manner set forth in Example 3. The hydrogenation was carried out with the use of a cobalt catalyst of the type used by Fischer for the catalytic hydrogenation of carbon monoxide. The hydrogenation temperature was maintained at 160° C. After the processing effected in the manner described in the preceding examples, 84% of the dicyclopentadiene charged could be obtained in the form of a 96% cyclopentene.

*Example 5*

A reaction apparatus was used which substantially consisted of a vertical tube of 100 cm. in length and 80 mm. in inside diameter. The tube was filled with a mixture of 3 parts by volume of hydrogenated $C_{14}$ hydrocarbon and 1 part by volume of dicyclopentadiene. This mixture was heated to 160° C. by the use of a thermo-syphon system. Thereby, the cyclopentadiene distilled off. Fresh cyclopentadiene was introduced to the thermo-syphon system at a rate of 80 cc. per hour.

For the separation of the cyclopentadiene from the entrained dicyclopentadiene, the vapor mixture issuing from the thermo-syphon circulation system was passed into a column provided with a dephlegmator attached thereto. The dephlegmator was maintained at 48° C., so that only cyclopentadiene vapors escaped from the column. These vapors were passed into a hydrogenation furnace which contained 280 cc. of the catalyst used in accordance with Example 1. The hydrogenation temperature was maintained at 110° C. During the hydrogenation, a hydrogen stream was passed through the hydrogenation furnace at a rate of 21 normal liters per hour. The gaseous products leaving the hydrogenation furnace were condensed. The unconverted cyclopentadiene was dimerized by a heat treatment and worked up by distillation. 90% of the dicyclopentadiene charged could be obtained in the form of a 98% cyclopentene.

*Example 6*

100 cc. of a hydrogenated $C_{16}$ hydrocarbon were filled into the round-bottomed flask shown in Fig. 2 and having a capacity of 1000 cc. By means of the funnel 20 and the stop-cock 21, 50 cc. dicyclopentadiene were slowly introduced into the flask which had been heated to 240° C. The escaping cyclopentadiene vapors passed through the column 26 maintained at 50° C. Here, the higher boiling portions entrained were separated.

The effluent vapors from column 26, together with 16 normal liters of hydrogen, were transferred into the hydrogenation tube 31 which had a length of 1 meter and contained 280 cc. of a catalyst consisting of 100 parts by weight of kieselguhr, 11 parts by weight of nickel, and 4 parts by weight of alumina. The temperature of the hydrogenation tube was maintained at 80° C. by means of the heating device 32.

After the passage through the cooler 34, the condensed raw cyclopentene was collected in receiver 35. The unconverted cyclopentadiene still present in the reaction mixture obtained in this receiver was dimerized by a heat treatment following which the cyclopentene was distilled off. In this manner, 89% of the dicyclopentadiene used as the starting material could be obtained as a 97% cyclopentene.

We claim:

1. Process for the production of cyclopentene, which comprises depolymerizing dicyclopentadiene to form monocyclopentadiene vapors and substantially immediately catalytically hydrogenating the monocyclopentadiene vapors so formed to thereby produce cyclopentene.

2. Process according to claim 1 in which said depolymerization is effected by passing the dicyclopentadiene downwardly through a mass of iron filing bodies at a temperature between about 150 and 250° C.

3. Process according to claim 1 in which said depolymerization is effected by passing the dicyclopentadiene through a body of a hydrocarbon having a boiling point of about 50° C. in excess of the boiling point of dicyclopentadiene and heated to a temperature between about 100 and 200° C.

4. Process according to claim 1 in which said catalytic hydrogenation is effected by passing the monocyclopentadiene vapors with hydrogen in contact with a catalyst selected from the group consisting of: (1) nickel and magnesia, (2) nickel and chromium oxide, (3) nickel and aluminum, and (4) cobalt, containing Fischer carbon monoxide hydrogenation catalysts at a temperature between about 50 to 200° C.

5. Process for the production of cyclopentene which comprises passing dicyclopentadiene through a mass of iron filing bodies at a temperature of 150 to 250° C., to thereby depolymerize the dicyclopentadiene, forming monocyclopentadiene vapors substantially immediately, contacting these vapors with hydrogen in the presence of a hydrogenation catalyst selected from the group consisting of: (1) nickel and magnesia, (2) nickel and chromium oxide, (3) nickel and aluminum, and (4) cobalt, containing Fischer carbon monoxide hydrogenation catalysts at a temperature between about 50 and 200° C. and recovering the cyclopentene formed.

6. Process according to claim 5 in which said catalyst is in the form of a fixed bed and in which said contacting is effected at a temperature of about 110 to 200° C., with about the theoretically required quantity of hydrogen.

7. Process according to claim 5 in which said contacting is effected with said hydrogenation catalyst at about normal pressure.

8. Process for the production of cyclopentene which comprises passing dicyclopentadiene through a body of hydrocarbons having a boiling point of about 50° C. in excess of the boiling point of dicyclopentadiene and heated to a temperature of about 100 to 200° C. to thereby depolymerize the dicyclopentadiene forming monocyclopentadiene vapors substantially immediately, passing the monocyclopentadiene vapors thus formed in contact with a hydrogen catalyst selected from the group consisting of: (1) nickel and magnesia, (2) nickel and chromium oxide, (3) nickel and aluminum, and (4) cobalt, containing Fischer carbon monoxide hydrogenation catalysts at a temperature between about 50 to 200° C. and recovering the cyclopentene formed.

9. Process according to claim 8 in which said hydrocarbon is heated to a temperature of about 130° to 160° C.

10. Process according to claim 8 in which said contacting with said hydrogenation catalyst is effected at about normal pressure.

11. Process according to claim 8 in which said hydrogenation catalyst is in the form of a fixed bed and in which said contacting therewith is effected at a temperature of about 110 to 200° C., with about the theoretically required quantity of hydrogen.

12. Process according to claim 8 in which said heating is effected by means of a thermo-syphon system with the heated hydrocarbon continuously circulated within the thermo-syphon system.

References Cited in the file of this patent

UNITED STATES PATENTS

| | | |
|---|---|---|
| 2,360,555 | Evans et al. | Oct. 17, 1944 |
| 2,453,044 | Staff | Nov. 2, 1948 |
| 2,584,531 | Arnold et al. | Feb. 5, 1952 |

FOREIGN PATENTS

| | | |
|---|---|---|
| 612,893 | Great Britain | Nov. 18, 1948 |

UNITED STATES PATENT OFFICE

CERTIFICATE OF CORRECTION

Patent No. 2,887,517            May 19, 1959

Heinz Noeske et al.

It is hereby certified that error appears in the printed specification of the above numbered patent requiring correction and that the said Letters Patent should read as corrected below.

Column 2, lines 37, 40 and 70, column 4, lines 67 and 68, column 5, line 4, and column 6, lines 15 and 33, for "filing", each occurrence, read -- filling --; column 3, line 74, for "yield" read -- yields --; column 6, line 58, for "hydrogen" read -- hydrogenation --.

Signed and sealed this 13th day of October 1959.

(SEAL)
Attest:

KARL H. AXLINE
Attesting Officer

ROBERT C. WATSON
Commissioner of Patents